United States Patent [19]

Shoji

[11] Patent Number: 5,035,547

[45] Date of Patent: Jul. 30, 1991

[54] MAGNET BASE DRILL UNIT

[75] Inventor: Michihiro Shoji, Tokyo, Japan

[73] Assignee: Nitto Kohki Co., Ltd., Tokyo, Japan

[21] Appl. No.: 528,745

[22] Filed: May 24, 1990

[30] Foreign Application Priority Data

Jun. 15, 1989 [JP] Japan ................................ 1-153517

[51] Int. Cl.[5] ........................ B23B 45/14; B23B 47/24

[52] U.S. Cl. .......................................... 408/6; 408/11; 408/76

[58] Field of Search ..................................... 408/5-16, 408/76

[56] References Cited

U.S. PATENT DOCUMENTS 4,261,673 4/1981 Hougen ............................ 408/76 X 4,604,006 8/1986 Shoji et al. ........................ 408/9 X

*Primary Examiner*—Steven C. Bishop

*Attorney, Agent, or Firm*—Kinney & Lange

[57] ABSTRACT

A magnet base drill unit in which the driving of the drill motor and the feed motor of the magnet base drill unit is stopped by operation of the switch which operates on the instant when sliding has been produced in the magnet base drill unit, and the stopping thereof is maintained electrically or electronically. A mercury switch comprising a cylindrical body in which mercury is sealed, and a pair of contacts provided so as to project into the cavity of the cylindrical body, or a vibration switch comprising a fixed contact, and a vibration responsive contact placed by a spring means in proximity to the fixed contact is preferably used.

7 Claims, 6 Drawing Sheets

MAGNET BASE DRILL UNIT

BACKGROUND OF THE INVENTION

1. Field of the Invention

This invention relates to a magnet base drill unit. More particularly, this invention relates to a magnet base drill unit which provided with a safety device that stops driving of the drill unit magnetically adhered onto a workpiece surface by an electromagnetic base thereof when the drill unit begins to slide on the workpiece surface.

2. Description of the Prior Art

A magnet base drill unit has so far been proposed, in which a drill unit with an automatic feeder and a magnet base are integrated, and the drill unit is attracted and fixed to a workpiece such as of metal using the magnet base to perform a hole cutting work.

The attraction force of the magnet in the prior art drill unit, is set so that it fully resists the cutting resistance caused by the hole cutting work of the drill unit and the feed load of the drill cutter, but by an unexpected cause, for instance, an excessive load occurring at the drill tip when cutting is started, or increase in the load due to the built-up edge formed on the drill cutter, and/or further, chips filling between the drill cutter and the workpiece during the hole cutting work, the load provided on the spindle of the drill motor and/or in the automatic feeder of the drill cutter may happen to exceed the attraction force of the magnet base.

In such case, the magnet base drill unit is subjected to a rotating force centering around the drill cutter and slides on the workpiece, and it can uncontrollably rotate while it is not attracted to the workpiece, or it can fall down violently. Thus, in such a case, at least the rotation of the drill cutter should be stopped instantaneously.

For this, in the U.S. Pat. No. 4261673 issued to Everett D. Hougen, for instance, magnet base drill unit is proposed which comprises a microswitch connected in series to the electric circuit of the drill motor, and a means for driving the switch which is constructed so as to turn on the switch when the attraction of the drill unit is normal and turn off it when the drill unit slides.

The above described switch drive means, as shown in FIGS. 3-5 of the specification, comprises a plunger which is movable in the direction perpendicular to the workpiece and is biased by a spring toward the workpiece, a finger having a pointed end and rotatably supported by a pivot pin at the workpiece side of the plunger, and a means for biasing the finger so that the pointed end faces the workpiece side, wherein the pointed end of the finger somewhat bites the workpiece when the attraction of the drill unit is normal, thereby preventing the drill from sliding.

Accordingly, when the magnet base drill unit slides, the finger pivots about the pointed end and the plunger is driven toward the workpiece, so that the above-mentioned switch is turned off and the rotation of the drill is stopped.

The above described prior art had the following problems. The aforementioned switch turns off by its drive means when the magnet base drill unit is made to slide, whereby the operation of the drill unit is stopped, but the drive means of the switch is required to be constructed so that the switch maintains an off state even after the sliding has ceased, which makes the construction of the drive means relatively complex. As a result, the magnet base drill unit becomes large-sized and the manufacture thereof is cumbersome and expensive.

Moreover, since the finger is adapted to pivot about the pivot pin, if the pivot pin is positioned so that its axis intersects the center axis of the drill cutter for instance, the switch drive means operates well when the magnet base drill unit slides about the drill, but it may not operate if the magnet base drill unit slides so that the cutting position itself of the drill shifts on the work face.

SUMMARY OF THE INVENTION

The object of the present invention is to provide a magnet base drill unit which has a simple construction, without being provided with such a switch drive means as described above, but can stop driving of the drill cutter instantaneously when the magnet base drill unit begins to slide.

In order to solve the aforesaid problems, the present invention is characterized in that a switch is provided which operates on the instant when sliding has been produced in the magnet base drill unit, and the driving of the drill motor and the feed motor of the magnet base drill unit is stopped by operation of the switch, and the stopping is maintained electrically or electronically. As a result, a switch drive means which has conventionally been used becomes unnecessary, and a switch of a relatively simple construction can be used for the present invention, which switch returns to its original state after the drill unit stops.

The stopping of the drill unit can be performed positively by using such vibration responsive, as a mercury switch comprising a cylindrical body in which mercury is sealed, and a pair of contacts provided so as to project into the cavity of the cylindrical body, or a vibration switch comprising a fixed contact, and a vibration responsive contact placed by a spring means in proximity to the fixed contact.

In addition, by making it possible to attach the switch so as to make any angle with the attraction surface of the magnet base, the stopping of the magnet base drill unit can be ensured even if the magnet base drill unit is attracted and attached onto a workpiece surface which is slanting or vertical.

DETAILED DESCRIPTION OF THE PREFERRED EMBODIMENT

Now, the preferred embodiment of the present invention is described in detail with reference to the drawings.

Figure 2:
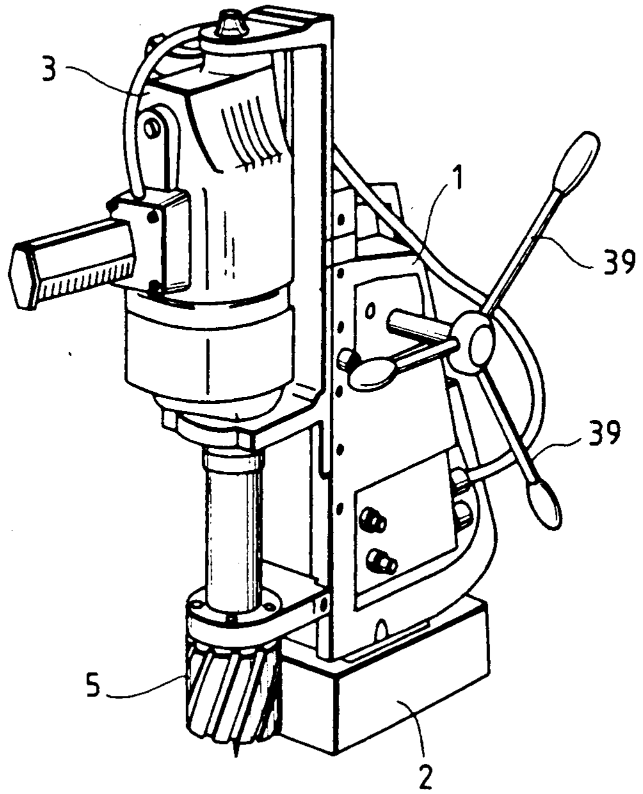
FIG. 2 is a perspective view of the embodiment of the present invention.
Figure 3:
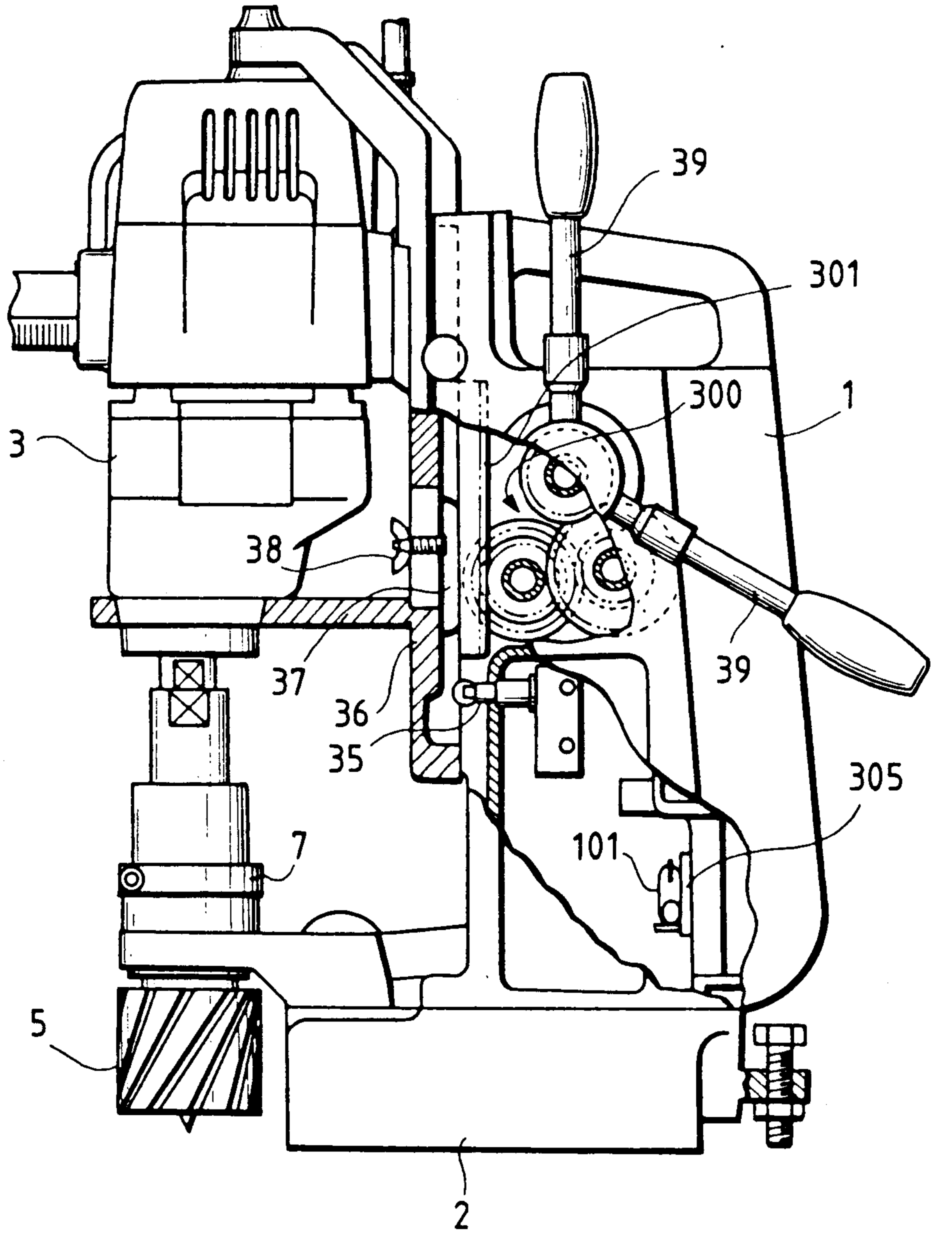
FIG. 3 is a side elevational view of FIG. 2.

In FIGS. 2 and 3, an electromagnetic base 2 is attached to the lower portion of a frame I. To the front portion of the frame 1, an electric drill 3 is attached so as to rise and fall by either a manual or an electrical means. An annular hole cutter 5 is mounted on the arbor assembly 7 of the electric drill 3. The feed motor of the electric drill 3 is built in the frame 1. A rotary handle 39 is used for manually feeding the electric drill 3. The electric drill 3 is fixed to a slide plate 36.

A switch panel 37 is fixed by a wing nut 38 to the slide plate 36. The switch panel 37 moves downward as the electric drill 3 falls, and actuates a limit switch 35 (described in detail later with reference to FIG. 4) when the edge of the annular hole cutter 5 lowers to a predetermined position after completion of the hole cutting work, thereby stopping the automatic feed and the driving of the electric drill. The operation circuit constituting the main portion of the present invention is disposed in the frame I.

A vibration responsive switch 101 such as a mercury switch is also placed in the frame 1, and as described later with reference to FIGS. 5 and 6, the contacts of the switch turn on and off when it is given a shock or vibration.

The rotation of the feed motor or the rotary handle 39 is transmitted to the slide plate 36 through a clutch (not shown), a gear train 300 and a rack 301, whereby the electric drill 3 is lifted up or lowered.

Figure 5:
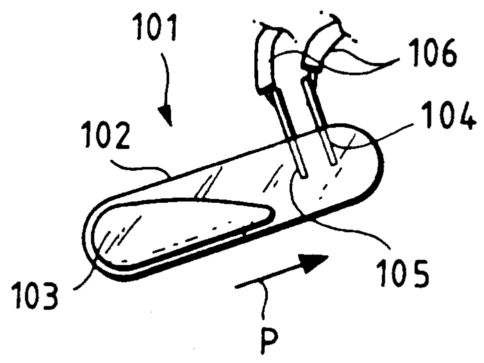
FIG. 5 is a front view of a mercury switch.
Figure 6:
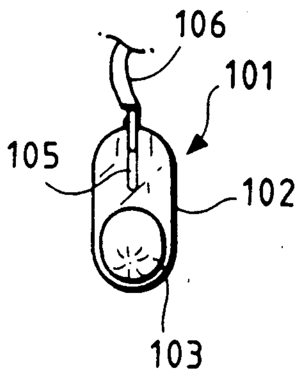
FIG. 6 is a side elevational view of the mercury switch shown in FIG. 5.

FIG. 5 is a front view of the mercury switch 101, and FIG. 6 is a side elevational view thereof. The mercury switch 101 consists of a glass tube 102, mercury 103 sealed in the glass tube 102, a pair of contacts 104 and 105 provided so as to project into the glass tube 102, and lead wires 106 connected to the contacts 104 and 105.

If the mercury with 101 is slightly slanted so that at least one of the contacts 104 and 105 is positioned higher than the surface level of the mercury 103, as shown in FIG. 5 for instance, the contacts 104 and 105 do not become conductive therethrough. That is, the mercury switch is off. When mounted in the frame 1, it is placed slantingly so that at least one of the contacts 104 and 105 is positioned somewhat higher than the surface level of the mercury 103 regardless of the orientation of the drill spindle, and when a shock or vibration is given to the mercury switch 101 or the frame 1, the mercury, which originally rested in the mercury reservoir, moves in the glass tube 102 as shown by an arror P in FIG. 5, whereby the contacts 104 and 105 turn on at least for a certain time.

Figure 1:
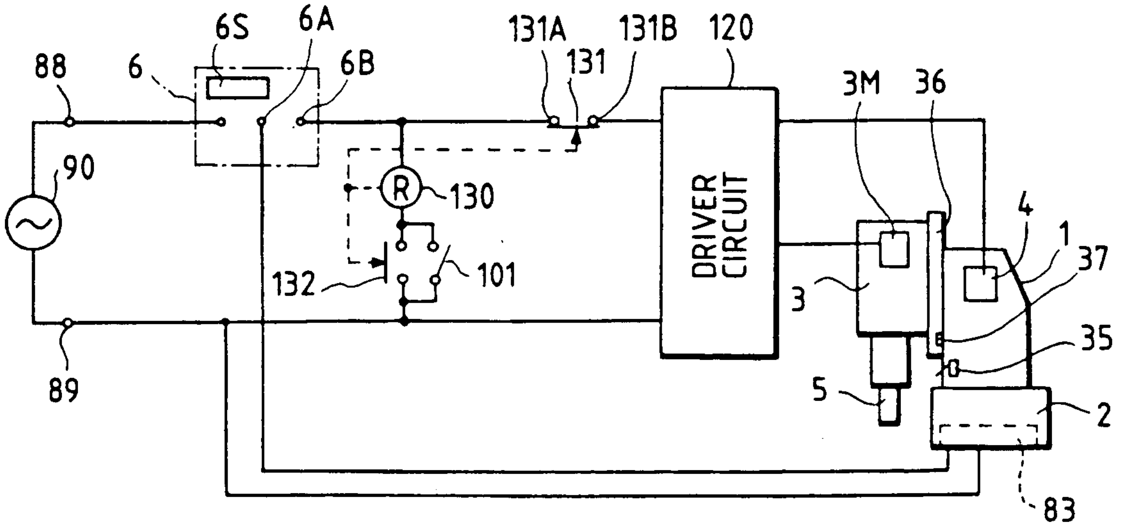
FIG. 1 is a functional block diagram of an embodiment of the present invention.

Now, the outline of the present invention is explained using the functional block diagram of FIG. 1 where the symbols same as those in FIGS. 2 and 3 represent the same or identical portions.

In FIG. 1, the start-up switch 6 of the magnet base drill is provided with contacts 6A and 6B. When the startup switch 6 is operated to move a slide contact piece 6S, in the first action thereof, the contact 6A closes and, in the subsequent second action, the contact 6B closes while the act 6A is closed.

When the contact 6A turns on by the first-step operation of the start-up switch 6, a first power supply terminal 88 is connected to one terminal of an electromagnet 83 within the electromagnetic base 2. When the contact 6B turns on by the second-step operation of the start-up switch, the first power supply terminal 88 is connected to a terminal 131A to be described later. The other terminal of the electromagnet 83 is connected to a second power supply terminal 89 of the magnet base drill unit.

A drill motor 3M and a feed motor 4 of the electric drill 3 are connected to a drive circuit 120. One input terminal of the drive circuit 120 is connected to the contact 6B of the start-up switch 6 through the normally closed contact 131 of a relay 130, and the other input terminal is connected to the second power supply terminal 89. One terminal of the contact 131 connected to the startup switch 6 is designated as "131A", and the other terminal thereof connected to the drive circuit 120 is designated as "131B" in this figure.

The relay 130 is connected in series between the contact 6B and the second power supply terminal 89 through its normally open contact 132. The mercury switch 101 is connected in parallel with the contact 132. An ac power supply 90 is connected between the pair of terminals 88 and 89. The arrangement of the drive circuit 120 can be of any one which is known to the skill in the art.

In operation, when the contact 6A is closed by the first-step operation of the start-up switch 6, the electromagnet 83 is energized to cause an electromagnetic attraction force in the electromagnetic base 2. By this, the magnet base drill unit 1 is magnetically adhered to a workpiece (not shown). When the contact 6B is closed by the second-step operation of the start-up switch 6, the drive circuit 120 is energized with the contact 6A being kept closed, whereby the drill motor 3M and the feed motor 4 are caused to rotate.

However, if the feed motor 4 rotates, the drill 3 will not begin to fall down immediately. To start the hole cutting, the manual rotary handle 39 is turned to allow the drill 3 to fall down, thereby the annular cutter 5 is caused to approach the surface of the workpiece. In response to engaging of a clutch (not shown), for instance, by the operation of the handle 39, the automatic feeding of the electric drill 3 is initiated.

The drive circuit 120 detects the load of the drill motor 3M by, for example, monitoring the current flowing in the drill motor 3M, and controls the feed motor 4 accordingly so that the load does not exceed a predetermined range. For instance, if overload of the drill motor 3M is detected, the feeding of the electric drill 3 by the feed motor 4 is temporarily slowed down or stopped. If the load lightens after the slowing down or the stopping of the feed motor 4, the feeding of the drill 3 is resumed, or if the overload of the drill motor 3M has reached a predetermined limit, not only the feed motor 4 is stopped, but also the drill motor 3M is stopped.

The mercury switch 101 disposed in the frame 1 is normally open as previously described, but it turns on at least for a short time by a slight vibration produced when something wrong such as sliding occurs with the magnet base drill unit, whereby the relay 130 is energized for causing the contact 131 to be open. The supply of power to the drive circuit 120 is cut as the result, and the drill motor 3M and the feed motor 4 are stopped. Since the contact 132 gets closed in this case, the relay 130 is self-held even if the mercury switch 101 becomes off thereafter. To release the operation of the relay 130, it is only needed to operate the start-up switch 6 to open the contact 6B.

An example of a detailed circuit diagram of the present invention is described below.

Figure 4:
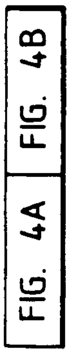
FIG. 4 constituting FIG. 4A
Figure 4A:
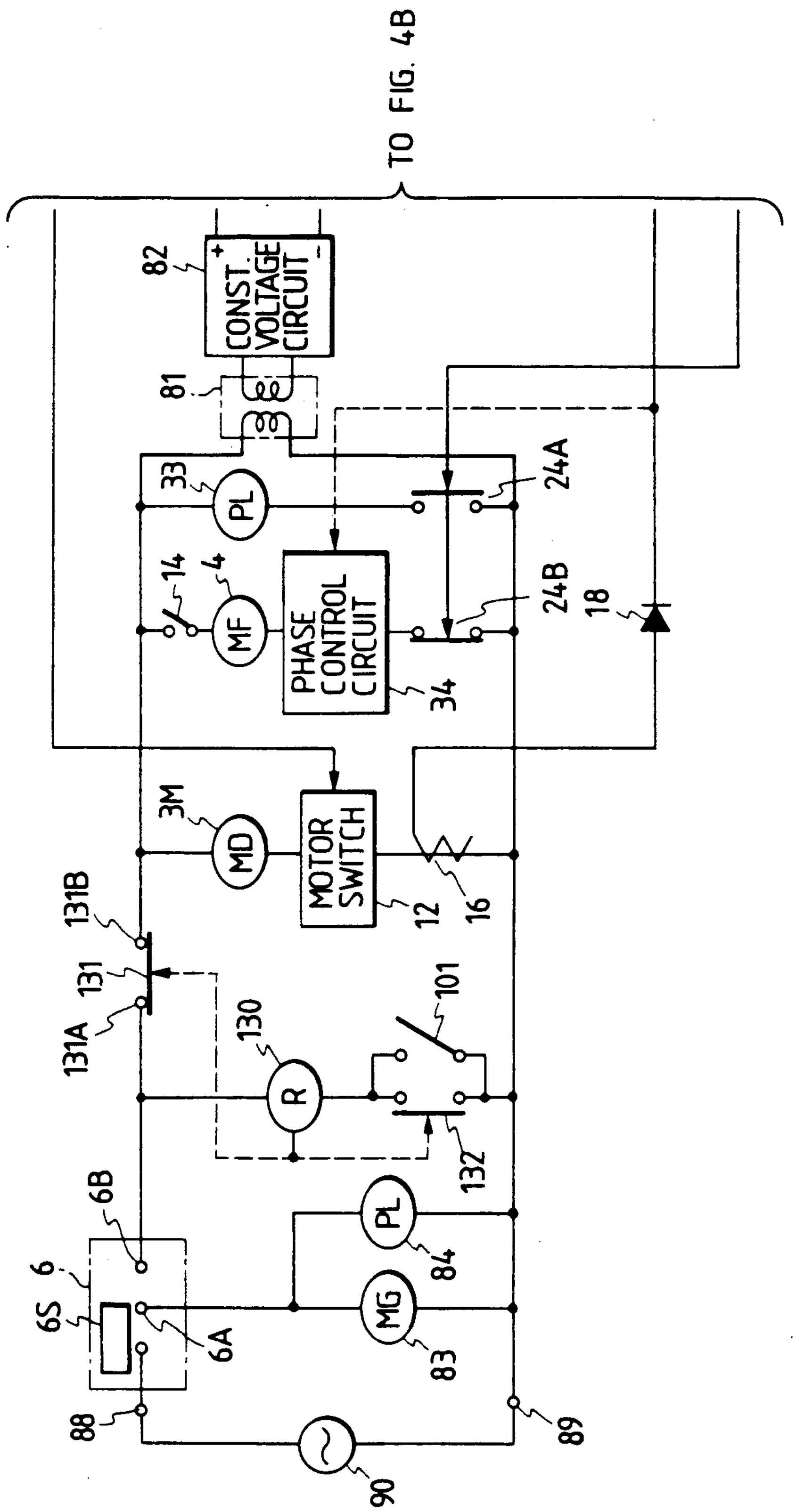
FIG. 4B is a circuit diagram of the embodiment of the present invention.
Figure 4B:
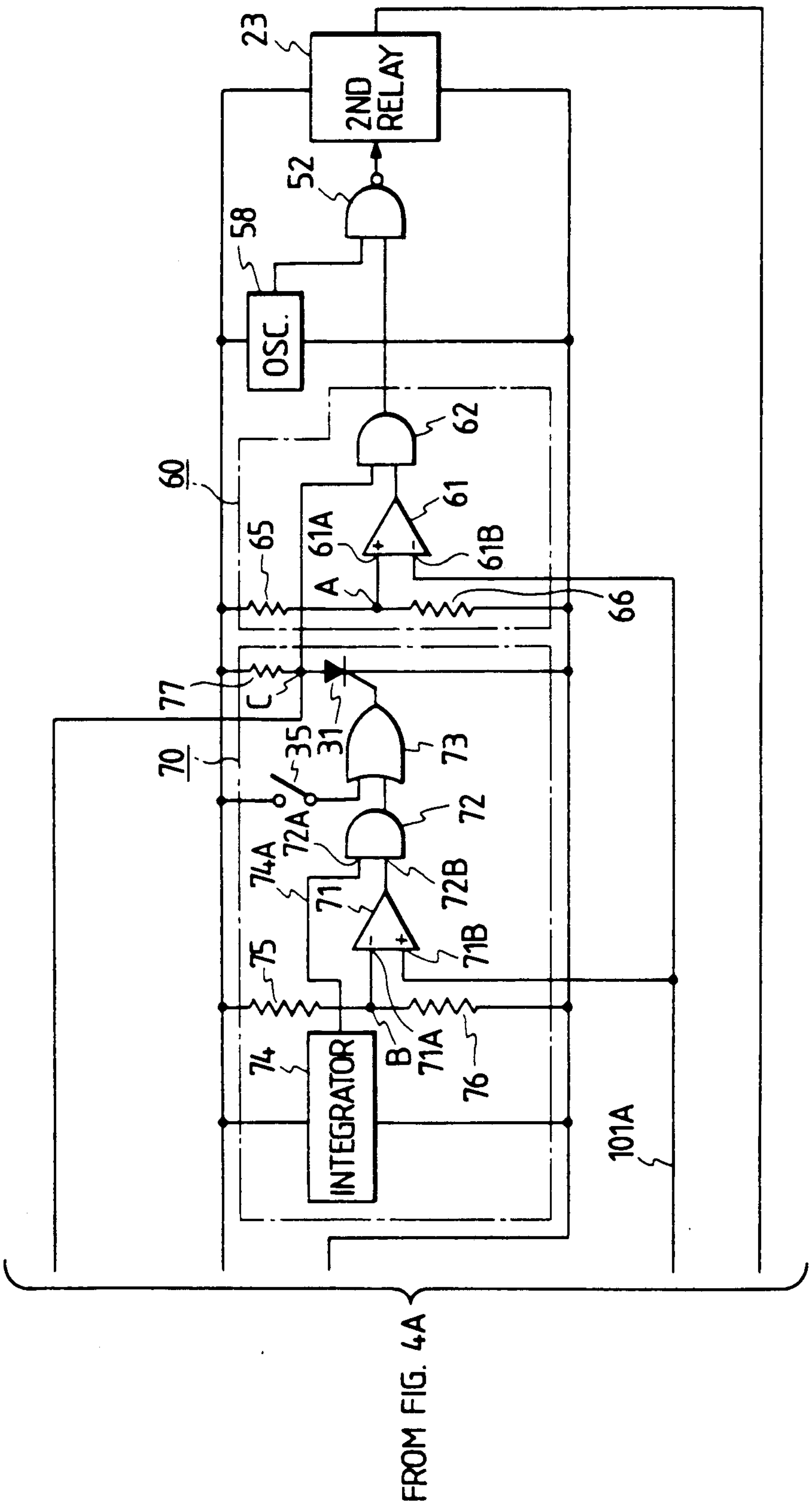

FIG. 4 is the concrete circuit diagram of one embodiment of the present invention. In the same figure, the symbols same as FIG. 1 represent the same or identical portions.

An electromagnet 83 and a pilot lamp 84 are connected in parallel between a second power supply terminal 89 and a contact 6A of a start-up switch 6. A drill motor 3M and a motor switch 12 are connected in series between the power supply terminal 89 and a terminal 131B. The motor switch 12 may be a solid-state switching element, which conducts upon application of a predetermined voltage to the control terminal thereof. The control terminal is connected to the anode of an SCR 31. A current transformer 16 detects the current flowing in the drill motor 3M and generates a voltage representative of the magnitude of the current.

A manual switch 14 serves for switching manual and automatic feedings, which switch 14 is turned on for the automatic feeding by the feed motor 4 and turned off for the manual feeding. If the previously described clutch is provided between the handle 39 (FIGS. 2 and 3) and the gear train 300 (FIG. 3), the manual switch 14 can be omitted.

The manual switch 14, the feed motor 4, a phase control circuit 34 and a contact 24B of a second relay 23, and an emergency alarm lamp 33 and a contact 24A of the relay 23 are, respectively, connected in series between the second power supply terminal 89 and the terminal 131B, as shown. The contact 24B is a normally closed contact, and 24A is a normally opened contact. A pair of primary terminals of a transformer 81 are also connected to the second power supply terminal 89 and the terminal 131B.

A rectifying constant-voltage circuit 82 is connected to the secondary terminals of the transformer 81. To the output terminals of the rectifying constant-voltage circuit 82, an integrating circuit 74, dividing resistors 75 and 76 which are connected in series, a series connection of a resistor 77 and the SCR 31, a pair of dividing resistors 65 and 66, an oscillating circuit 58, and the second relay 23 are connected respectively as shown. The oscillating circuit 58 may generate a rectangular wave signal which is supplied to the second relay 23 through a NAND circuit 52 and performs an on/off control thereof at preset time intervals.

The inverted input terminal 71A of a comparator 71 is connected to the node B of the dividing resistors 75 and 76, and its non-inverted input terminal 71B is connected to the output line 101A of the current transformer 16 through a diode 18. To one input terminal 72B of a second AND circuit 72, the output terminal of the comparator 71 is connected, and to the other terminal 72A thereof, the output line 74A of the integrating circuit 74 is connected. One input terminal of an OR circuit 73 is connected to the output terminal of the second AND circuit 72, and the other terminal thereof is connected to the positive output terminal of the rectifying constant-voltage circuit 82 via a normally opened limit switch 35. The output terminal 73 of the OR circuit 73 is connected to the control gate of the SCR 31.

The anode of the SCR 31 is connected to the control terminal of the motor switch 12 as described before. The non-inverted input terminal 61A of a comparator 61 is connected to the node A of the dividing resistors 65 and 66, and the inverted input terminal 61B thereof is connected to the output line 101A of the current transformer 16. One input terminal of a first AND circuit 62 is connected to the output terminal of the comparator 61, and the other terminal thereof is connected to the anode of the SCR 31.

One input terminal of the NAND circuit 52 is connected to the output terminal of the first AND circuit 62, and the other input terminal thereof is connected to the output terminal of the oscillating circuit 58. The output terminal of the NAND circuit 52 is connected to the control terminal of the second relay 23.

The resistors 65, 66, 75 and 76 are selected so that the potential of the nodes A and B are a first and a second threshold values, respectively. The portions shown by symbols 60 and 70 constitute a first and a second detection circuits, respectively. The first and second detection circuits 60 and 70 discriminate and evaluate the value of the current flowing in the drill motor 3M, respectively.

As described later in detail, if the current through the drill motor 3M exceeds the preset first threshold value, the detection circuit 60 overrides the operation of the oscillating circuit 58 and activates the second relay 23 to open it contact 24B, thereby stopping the feed motor 4. If the current of the drill motor 3M exceeds the preset second threshold value which is higher than the first threshold value, the second detection circuit 70 further opens the motor switch 12 to stop the drill motor 3M.

In operation, when the power supply terminals 88 and 89 are connected to the ac power supply 90 and the first-step operation of the start-up switch 6 is performed, first the contact 6A is closed to energize the electromagnet 83 and light the pilot lamp 84, thereby the magnet base drill is magnetically adhered to the workpiece.

Subsequently, when the contact 6B of the switch 6 is turned on, a dc constant-voltage is output from the rectifying constant-voltage circuit 82. Then, the manual switch 14 is closed and the feed motor 4 begins to rotate.

The potential determined by the dividing resistors 75 and 76 is applied to the inverted terminal 71A of the comparator 71. At first, however, the drill motor 3M has not yet started up and no potential is applied to the noninverted terminal 71B, so the output of the comparator 71 is "0". And the limit switch 35 is opened. Thus, the output of the OR circuit 73 is also "0" so that the SCR 31 is not fired and at its anode or node C, a voltage appears which is enough to turn on the motor switch 12. By this, the drill motor 3M starts to rotate.

When the drill motor 3M is started up, a large rush current flows in the drill motor 3M as well known, so a voltage corresponding to the rush current occurs on the output line 101A of the current transformer 16. In this case, the voltage applied to the non-inverted terminal 71B may exceed the voltage applied to the inverted terminal 71A, making the output of the comparator 71 "1". But, since the time constant of the integrating circuit 74 is predetermined so that it provides no output during the occurrence of the rush current when the drill motor 3M is started up, that is, it does not provide the output signal to the input terminal 72A until the rush current flowing in the drill motor 3M at the start-up time decreases to a stationary value and the output of the comparator 71 goes to "0", the output of the second AND circuit 72 is kept at "0" independently of the rush current. Therefore, no trigger signal is supplied to the gate of the SCR 31 and the motor switch 12 is never opened in that period.

The potential at the inverted input terminal 61B of the comparator 61 becomes smaller than the potential at the non-inverted input terminal 61A when the current value of the drill motor 3M becomes the stationary value, so the output of the comparator 61 becomes "1". Since the SCR 31 has not yet conducted at this time, the potential at the node C, namely, the other input of the first AND circuit 62 is high and thus the output of the first AND circuit 62 is "1". Accordingly, the second relay 32 performs an on/off operation at time interval determined by the rectangularwave output of the oscillating circuit 58. By this, the contacts 24A and 24B of the second relay 23 are opened and closed intermittently, and the feed motor 4 repeats rotation/stop at predetermined time intervals.

At this point, the rotation of the feed motor 4 is transmitted to the slide plate 36 by the clutch operation (not described in detail) through the manual rotary handle 39, and the electric drill 3 falls intermittently and the edge of the annular hole cutter 5 begins to annularly cut the surface of the workpiece. Subsequently, the feed motor 4 rotates intermittently in response to the intermittent operation of the second relay 23 to perform the intermittent feed operation of the electric drill 3 (hereinafter referred to as step feed). The speed regulation of the feed motor 4 is carried out by, for instance, some known phase control circuit 34.

The step feed of the electric drill 3 serves to break in pieces chips formed by hole cutting, and the discharging of chips is facilitated by this operation. With this, the possibility of an impact load being applied to the annular hole cutter 5 decreases, whereby the lifetime of the annular hole cutter 5 is prolonged.

If the load on the annular hole cutter 5 is heavy and the current in the drill motor 3M becomes large, then the potential of the output line 101A becomes higher than that of the node A (or the first threshold value). As the result, tbe outputs of the comparator 61 and the first AND circuit 62 go to "0". That is, the output of the first detection circuit 60 becomes "0". Accordingly, the NAND circuit 52 always outputs "1" in spite of the fact that the oscillating circuit 58 supplies repetitive pulses to the NAND circuit 52, so that the second relay 23 stops the intermittent operation and opens the contact 24B. The rotation of the feed motor 4 and the step feed of the electric drill 3 are stopped, and the pilot lamp 33 is lighted.

When the load on the annular hole cutter 5 is reduced and the potential of the output line 101A becomes again lower than the potential at the node A, the output of the comparator 61 becomes "1", and the step feed of the electric drill 3 is resumed.

If the load on the annular hole cutter 5 is not reduced in despite of the forced stop of the feed motor 4 by the first detection circuit 60, and the current flowing in the drill motor 3M further increases and tbe potential on the output line 101A becomes higher than the potential at the node B (or the second threshold value), then the comparator 71 outputs "1". This allows the second AND circuit 72 to output "1", which is applied to the gate of the SCR 31 via the OR circuit 73. Thus, the SCR 31 conducts and the potential at the node C lowers. By the reduction of the potential at the node C, or by the output of the second detection circuit 70 becoming "0", the motor switch 12 is turned off and not only the feed motor 4 but also the drill motor 3 stops.

The clutch associated with the feed motor 4 is disengaged to change the feed mode from manual to automatic, and the manual rotary handle 39 is operated to cause the electric drill 3 to rise. The start-up switch 6 is restored to the position of the first step to open the contact 6B, d and with the power supply to the drill motor 3M and the feed motor 4 of the electric drill 3 being disconnected, the cause of the occurrence of the excessive load is removed by, for example, removing the chips. When the contact 6B is opened, the output voltage of the rectifying constant voltage circuit 82 disappears, so tbe voltage between the anode and the cathode of the SCR 31 disappears, the BOR 31 returns to the off-state, and the first and second detection circuits 60 and 70 return to the initial states.

If the contact 6B of the start-up switch 6 is closed after removing the cause of the overload on the annular hole cutter 51 the drill motor 3M starts to rotate again. The rotary handle 39 is operated again to lower the electric drill 3 manually, thereby lowering the edge of the annular hole cutter 5 to the previous cutting depth. At this point, the clutch is engaged to switch the motor feed from manual to automatic, and the automatic feed by the feed motor 4 is performed to carry out the hole cutting work with the annular hole cutter 5 under a torque not greater than a predetermined level.

When the tip of the annular hole cutter 5 has reached the under surface of the workpiece, completing the hole cutting cork, the switch panel 37 (FIG. 3) closes the limit switch 35 which panel attached to the inner surface of the slide plate 36 (FIG. 3) that advances along with the electric drill 3. A gate signal is supplied to the SCR 31 which then conducts, and the potential at the node C reduces. Since the motor switch 12 turns off and the second relay 23 continuously turns on, the drill motor 3M and the feed motor 4 of the electric drill 3 stop automatically.

If the magnet base drill is moved to another place after the hole cutting work has been completed, the electromagnet base 2 attached to the lower portion of the frame 1 is deenergized. This permits the magnet base drill to be moved freely to the next hole cutting position.

Even in the magnet base drill unit having the drive circuit for the drill motor 3M and the feed motor 4 mentioned above, the drill unit may slide suddenly if the magnetically adhesive force of the electromagnet base can not resist the external force due to a certain cause such as the cutting resistance exceeding the tolerance. In the present invention, the vibration responsive switch such as the mercury switch 101 senses the sliding of the electromagnetic base and turns on at least for a short time, so the relay 130 is energized to be self held and the normally closed contact 131 is opened. The power supply to the drive circuit 120 is cut, and the drill motor 3M and the feed motor 4 are stopped.

In the control circuit shown in FIG. 4, the potentials at the nodes A and B are determined by the dividing resistors 65, 66, 75 and determine the timing for stopping the feed motor 4 and the drill motor 3M or motor current condition. Therefore, the potentials are preferably adjusted to appropriate values which depend on the types of the tools attached to the electric drill 3 or on the dimensions of their bores. Tbe adjustment of the potentials can easily be implemented by, for instance, constituting at least one resistor of each dividing resistor circuit networks with a variable resistor.

If the interval of the on/off operation of the step feed of the electric drill 3, that is, the oscillation cycle and duty ratio of the oscillating circuit 58 are adjusted depending on the types of the tools or the dimensions of their bores, the hole cutting work can also be done efficiently.

In the above description, the means for intermittently driving the feed motor 4 in response to the output of the oscillating circuit 58 and the means for continuously stopping the feed motor 4 in response to the output of the first detection circuit 60 are both comprised of the single second relay 23, but these two means can be two independent switches which are controlled by different relay circuits respectively.

In the embodiment shown in FIG. 4 the phase control circuit 34 is not influenced by the potential on the output line 101A. It is possible, however, that the potential signal on the output line 101A is supplied to the phase control circuit 34 as shown by a dotted line in FIG. 4 so that the rpm of the feed motor 4 decreases as the load of the drill motor 3M increases or the potential signal on the output line 101A rises.

Although, in the above described embodiment, the mercury switch 101 is used as the switch for energizing the relay 130 for stopping the supply of power to the drive circuit 120 (FIG. 1) for the drill motor 3M and the feed motor 4, the present invention is not limited only to this. Any switch may be used if it sensitively responds to the vibration generated when the magnet base drill unit begins to slide.

Figure 7:
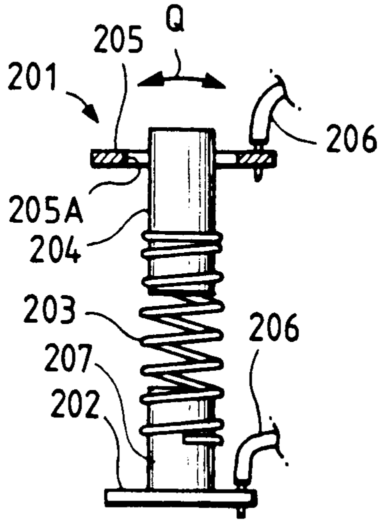
FIG. 7 is a front view partly in section of another example of the switch for energizing the relay 130 in FIG. 4.
Figure 8:
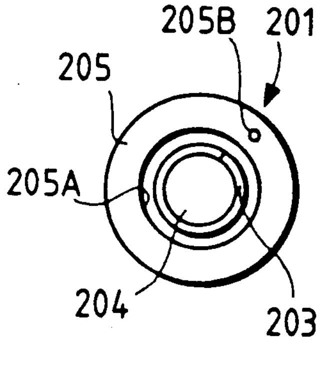
FIG. 8 is a plan view of FIG. 7.

FIG. 7 is a front view of another example of the vibration responsive switch which can be an alternate to the mercury switch 101, and FIG. 8 is a plan view of FIG. 7. A fixed contact is annular as shown in FIG. 8. One end of a coil spring 203 is attached to a column-shaped body 207 planted on a substrate 202, and a vibration responsive contact 204 is attached to the other end of the coil spring 203 for swing in the radial direction. The size of the vibration responsive contact 204 is set to be smaller than the diameter of the center hole 205A of the fixed annular contact 205, so that it fits in the center hole 205A. The end portion of the vibration responsive contact 204 to which the coil spring 203 is not attached is positioned so that it is inserted and placed in the hole portion 205A of the fixed contact 205.

The substrate 202, coil spring 203, vibration responsive contact 204 and fixed contact 205 are formed of electric conductive materials, the opposite ends of the coil spring 203 are fixed to the substrate 202 and the vibration responsive contact 204 by means such as soldering. Lead wires 206 are also soldered to the substrate 202 and the fixed contact 205. A lead hole 205B shown in FIG. 8 is for attaching the lead wire 206 to the fixed contact 205.

The substrate 202 and the fixed contact 205 of the vibration responsive switch 201 are fixed to an appropriate position in the magnet base drill unit through a proper means such as a case or support members so that the vibration responsive contact 204 is positioned in the center of the hole portion 205A of the fixed contact 205, and fixed at a relative position in which they are not in contact with each other. If the substrate 202 and the fixed contact 205 are mounted in the frame 1 (FIGS. 1-3), it is safe since each contact is not exposed. When the magnet base drill unit slides, the vibration responsive contact 204 swings in the directions of a double arrow and the vibration responsive contact 204 and the fixed contact 205 intermittently contact each other, that is, the vibration responsive switch 201 repeatedly turns on.

If the vibration responsive switch 201 is used as an alternate to the mercury switch 101 shown in FIG. 1, the drill motor and the feed motor of the drill unit can be stopped quickly and securely.

In the mercury switch 101 shown in FIG. 5, the mercury 103 can be best moved if an impact is applied in the direction of the center axis of the glass tube 102 (in the direction of the arrow P of FIG. 5), while for good operation of the vibration responsive switch 201, it is only needed that in impact is applied in a direction intersecting the center axis of the vibration responsive contact 204, so that it reacts sensitively even to a small vibration and the contacts thereof 204 and 205 promptly closes.

Although 203 is a coil spring in the example shown in FIGS. 7 and 8, a spiral spring, a leaf spring or various kinds of formed wire springs may be used. The mercury switch 101 and the vibration responsive switch 201 are normallY open, and disposed in the frame 1 of the magnet base drill unit so that they respond to a vibration and at least momentarilY close only when the magnet base drill unit slides to generate the vibration.

If the magnet base drill unit is magnetically attached to a workpiece surface which is horizontal, and when the mercury switch 101 is employed, it is desirably attached so that the end portion thereof where the contacts 104 and 105 are provided is positioned at a little upper level as shown in FIG. 5, and when the vibration responsive switch 201 is used, it is desirably attached so that the vibration responsive contact 204 vertically stands as shown in FIG. 7.

When the magnet base drill unit is attached to a workpiece surface which is slanted relative to a horizontal plane, if the slope is relatively small and the mercury switch 101 or the vibration responsive switch 201 is allowed to closes only when the magnet base drill unit slides, the attaching position or the posture of the mercury switch 101 or vibration responsive switch 201 needs not be changed, but, if the inclination of the workpiece surface is relatively large and the switch 101 or 201 may be closed even by a feeble vibration which is not caused by the sliding of the drill unit, it is required to vary the fixing attitude of the switch depending on the fixing tilt angle of the magnet base drill unit.

The tilt mechanism of the switch which is used for this purpose is constructed as follows, for instance; the base plate 305 (FIG. 3) on a main surface of which the mercury switch 101 or the vibration responsive switch 201 is fixedly attached, is mounted on the magnet base drill unit so that the base plate can be inclined in a plane perpendicular tc the magnetically adhesive plane of the magnet base 2 of the drill unit.

With that construction, even in the case that the magnet base drill unit is attached to a tilted workpiece, it is possible to attach the mercury switch 101 or the vibration responsive switch 201 so as to make any angle with the magnetically adhesive plane of the magnet base by causing the attaching plate 305 to slant in certain angle depending on the degree of tilt of the magnetically adhesive plane. When the mercury switch 101 is used, it may be mounted, as shown in FIG. 5, so that one end portion thereof where the contacts 104 and 105 are provided is positioned a little higher level than the other end, while when the vibration responsive switch 201 is used, it may be mounted so that the vibration responsive contact 204 stands vertically as shown in FIG. 7.

Although it has been described that the restoration of the relay 130, that is, the release of self holding after its operation is performed by opening the contact 6B of the start-up switch 6, instead it is also possible that a normally closed switch (b-contact) for releasing the operation of the relay 130 is provided in series with the relay 130 and the switch 101.

Although it has been described that, when the mercury switch 101 is used, it is placed so as to be normally opened, and that the drive circuit for the drill motor 3M and the feed motor 4 is deenergized if the switch 101 is closed, it is also possible that the mercury switch is used as normally closed and disposed so as to be opened only when the magnet base drill unit slides, thereby stopping the drive circuit.

Figure 9:
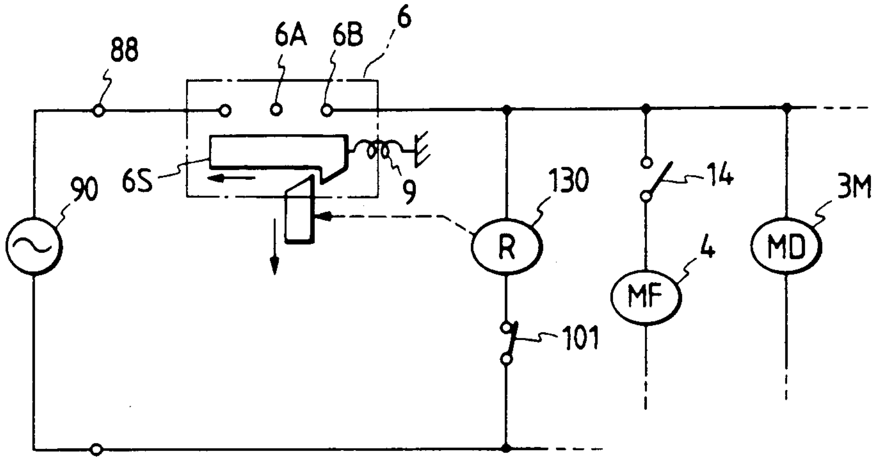
FIG. 9 is a schematic diagram of another embodiment of the present invention.

In this case, for instance, the relay 130 and the mercury switch 101 are connected in series so that the relay 130 is always energized, and simultaneously the contact 6B of the start-up switch 6 is biased by a spring means in the direction from the closed state to the opened state of the contact 6B, and the contact 6B of the switch 6 is held to be closed by engagement of a ratchet mechanism 10 or the like by the operation of the relay 130 during the operation of the drill motor 3M of the electric drill 3, as shown in FIG. 9. If the mercury switch 101 is once opened by the vibration of the drill unit, the ratchet mechanism is released, the contact 6B is opened (6A is held to be closed) and the motor 3M and the feed motor 4 of the electric drill are stopped.

Figure 10:
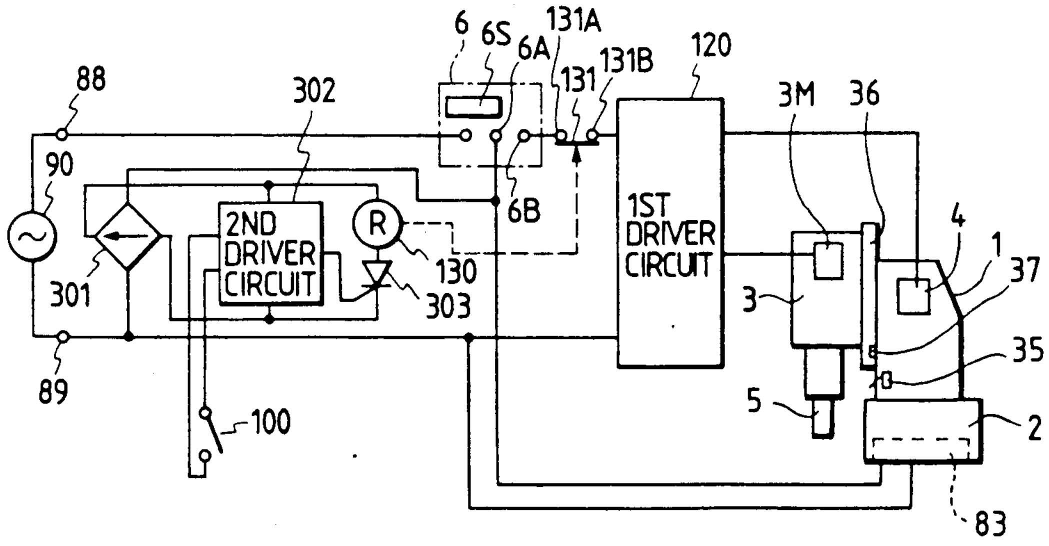
FIG. 10 is a functional block diagram of still other embodiment of the present invention.

FIG. 10 is a functional block diagram of still other embodiment of the present invention. In FIG. 9, the same symbols as FIG. 1 represent the same or identical portions.

A second drive circuit 302 is supplied the output of a bridge type rectifier 301 as the operation power, and generates a trigger signal of a current controller 303 such as a SCR, in response to the operation of a vibration responsive switch 100. The current controller 303 is connected in series to a relay 130 and controls the current through the relay 130 in response to the output trigger signal of the second drive circuit 302.

The second drive circuit 302 outputs a trigger signal to the current controller 303 when it detects that the state of the normally open (or closed) vibration responsive switch 100 has been changed from the normal state to the operation state by the sliding of the magnet base drill unit or the like. Whereupon, the relay 130 operates to open the relay contact 131. As long as the output power is obtained from the rectifier 301, the drive circuit 302 continues to output the trigger signal even though the contacts of the vibration responsive switch 101 have been restored. Therefore, the contact 131 is maintained in the open state. Such drive circuit 302 will be easily formed by those skilled in the art without any further description.

ADVANTAGES OF THE INVENTION

As apparent from the above description, the following technical advantages are achieved by the present invention. (1) Since the switch means for detecting the sliding of the magnet base drill unit is used as the means for stopping the drill motor, it is not needed to be the switch drive means which maintains the switch in the activated state after the detection of the sliding, and the construction of the safety mechanism of the magnet base drill unit is simplified. (2) Since the sliding detection switch has not so remarkable directional properties in sensitivity, it operates substantially with no delay when a slide occurs in the magnet base drill unit, so that it can immediately stop the operation of the magnet base drill unit when some abnormal state thereof occurs and can prevent the drill unit in advance from overturning. (3) Since the switch can be attached in predetermined position and direction even if the magnet base drill unit is magnetically adhered onto a tilting surface of the workpiece, the operation of the sliding detection switch can be performed with high reliability.

What is claimed is:

1. In a magnet base drill unit comprising a frame having a magnet base causing the drill unit to be magnetically adhered onto a workpiece, an electric drill having a drill motor, and a feed motor fixed to the frame for advancing the electric drill toward the workpiece, the magnet base drill unit including means for detecting the sliding of the drill unit comprising a vibration responsive switch, which is fixed to the frame and actuated in response to a vibration due to the sliding of the magnet base drill unit, and a power supply release means responsive to the output of the slide detection means for stopping the supply of power to the electric drill and the feed motor.

2. The magnet base drill unit as set forth in claim 1 wherein the switch comprises a hollow cylindrical body which is electrically insulating, a conductive liquid sealed in the cylindrical body, and a pair of contacts provided so as to project into said cylindrical body.

3. The magnet base drill unit as set forth in claim 1 wherein the switch comprises a fixed contact, and a vibration responsive contact supported on a base member by a spring means in proximity to fixed contact, the vibration responsive contact being caused to rock and contact with the fixed contact by an external vibration.

4. The magnet base drill unit as set forth in claim 1 wherein the attaching attitude of tbe switch is adjustable so that it forms a predetermined angle with the magnetically adhesive surface of the magnet base.

5. The magnet base drill unit as set forth in claim 1 wherein the power supply release means is an electric relay switch.

6. The drill unit as set forth in claim 5 wherein the vibration responsive switch and the relay are adapted to be connected in series each other between a first and a second power supply terminals, and the contact controlled by the relay is connected with, respectively, the drill motor and feed motor in series between the first and second power supply terminals.

7. The drill unit as set forth in claim 5 wherein the relay and a current controller are adapted to be connected in series each other between a first and a second power supply terminals, the contact controlled by the relay is connected with, respectively, the drill motor and feed motor in series between the first and second power supply terminals, and a circuit means generates a signal for energizing the current controller and the relay responsive to the operation of the vibration responsive switch.

* * * * *